(12) United States Patent
Chen et al.

(10) Patent No.: US 8,130,232 B2
(45) Date of Patent: Mar. 6, 2012

(54) DRAWING CONTROL METHOD, DRAWING CONTROL APPARATUS, AND DRAWING CONTROL SYSTEM FOR EMBEDDED SYSTEM

(75) Inventors: Chung-Hsin Chen, Changhua County (TW); Chieh-Sheng Tu, Hsinchu (TW); Tien-Der Yeh, Miaoli County (TW); Chi-Chuang Hsu, Hsinchu (TW); Che-Wei Chang, Changhua County (TW)

(73) Assignee: Nuvoton Technology Corporation, Hsinchu (TW)

( * ) Notice: Subject to any disclaimer, the term of this patent is extended or adjusted under 35 U.S.C. 154(b) by 932 days.

(21) Appl. No.: 12/140,477

(22) Filed: Jun. 17, 2008

(65) Prior Publication Data

US 2009/0309880 A1 Dec. 17, 2009

(51) Int. Cl.
*G09G 5/36* (2006.01)
*G09G 3/36* (2006.01)

(52) U.S. Cl. .......................... 345/560; 345/545; 345/100

(58) Field of Classification Search .................. 345/545, 345/560, 537, 538, 100
See application file for complete search history.

(56) References Cited

U.S. PATENT DOCUMENTS

| 5,016,876 A | 5/1991 | Loffredo |
| 5,563,623 A * | 10/1996 | Barrett, Jr. ..................... 345/98 |
| 5,680,533 A | 10/1997 | Yamato et al. |

* cited by examiner

*Primary Examiner* — Hau Nguyen
(74) *Attorney, Agent, or Firm* — J.C. Patents (57) ABSTRACT

A drawing control method, a drawing control apparatus, and a drawing control system for embedded system are provided. The present invention adopts an independent drawing control apparatus to control a drawing unit to draw a frame, and move the drawn frame to an external frame buffer in advance, and therefore the number of lines that can be drawn is not restricted by the capacity of the memory of the drawing unit. Further, the present invention employs a counter to accumulate a counting number upon each time completion of drawing frame or moving frame. Whenever the counting number is accumulated, the drawing unit is controlled to perform a next stage of frame drawing or frame moving. In this concern, the present invention eliminates the time for external accessing, and thus achieving parallel processing, and instant displaying.

27 Claims, 7 Drawing Sheets

DRAWING CONTROL METHOD, DRAWING CONTROL APPARATUS, AND DRAWING CONTROL SYSTEM FOR EMBEDDED SYSTEM

BACKGROUND OF THE INVENTION

1. Field of the Invention

The present invention generally relates to a drawing control method, a drawing control apparatus, and a drawing control system, and more particularly, to a method, an apparatus, and a system for controlling a drawing unit to draw a frame.

2. Description of Related Art

Recently, in accordance with the development of computer graphic (CG) technology, a computer is often demanded to carry out more computation load when performing graphic drawing operations. In order to relieve the work burden undertaken by the central processing unit (CPU), it is conventional to dispose an additional graphics processing unit (GPU) on the computer mainboard, or additionally introduce a graphics card for assisting the computer to perform the graphic computation, so as to improve a speed of the graphic processing.

The GPU often operates along with a set of frame buffer when performing the graphic computation, for temporarily storing frames which are going to be displayed on the display. Such a frame buffer are desired to be capable of accommodating data of at least one entire frame, and providing for the display for fast accessing and instant displaying.

Figure 1:
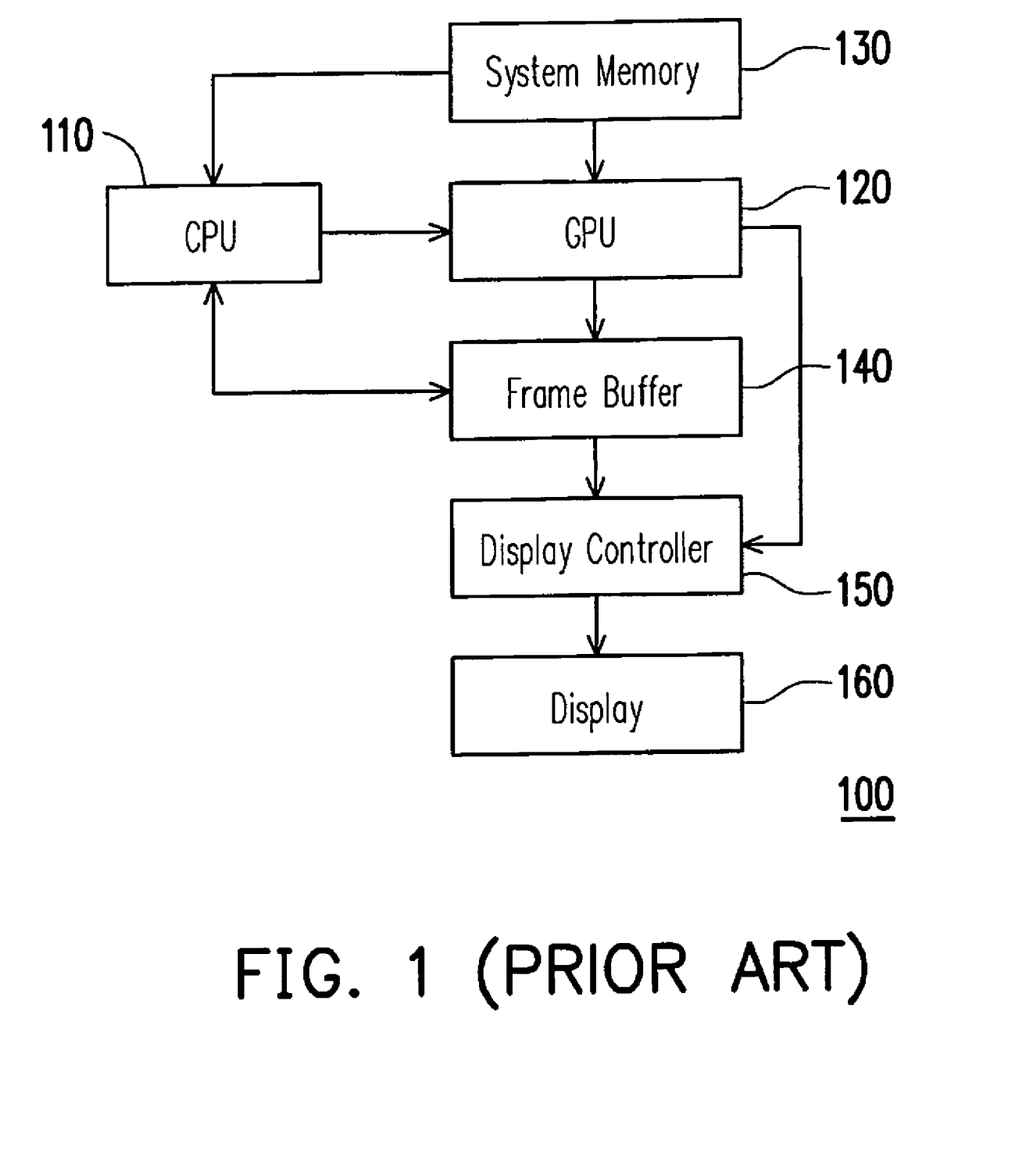
FIG. 1 is a block diagram illustrating a conventional embedded system 100 employing a GPU.

FIG. 1 is a block diagram illustrating a conventional embedded system 100 employing a GPU. Referring to FIG. 1, the embedded system 100 includes a CPU 110, a GPU 120, a system memory 130, a frame buffer 140, a display controller 150, and a display 160. The GPUS 120 is used for transferring graphic data to be displayed on the display 160 from the system memory 130 to the frame buffer 140. The GPU 120 is required to be capable of directly accessing graphic data stored in the system memory 130, and storing the graphic data into the frame buffer 140 in accordance with the First-In-First-Out (FIFO) principle, so that the graphic data to be displayed can be provided to the display 160 by the access and control of the display controller 150.

Figure 2:
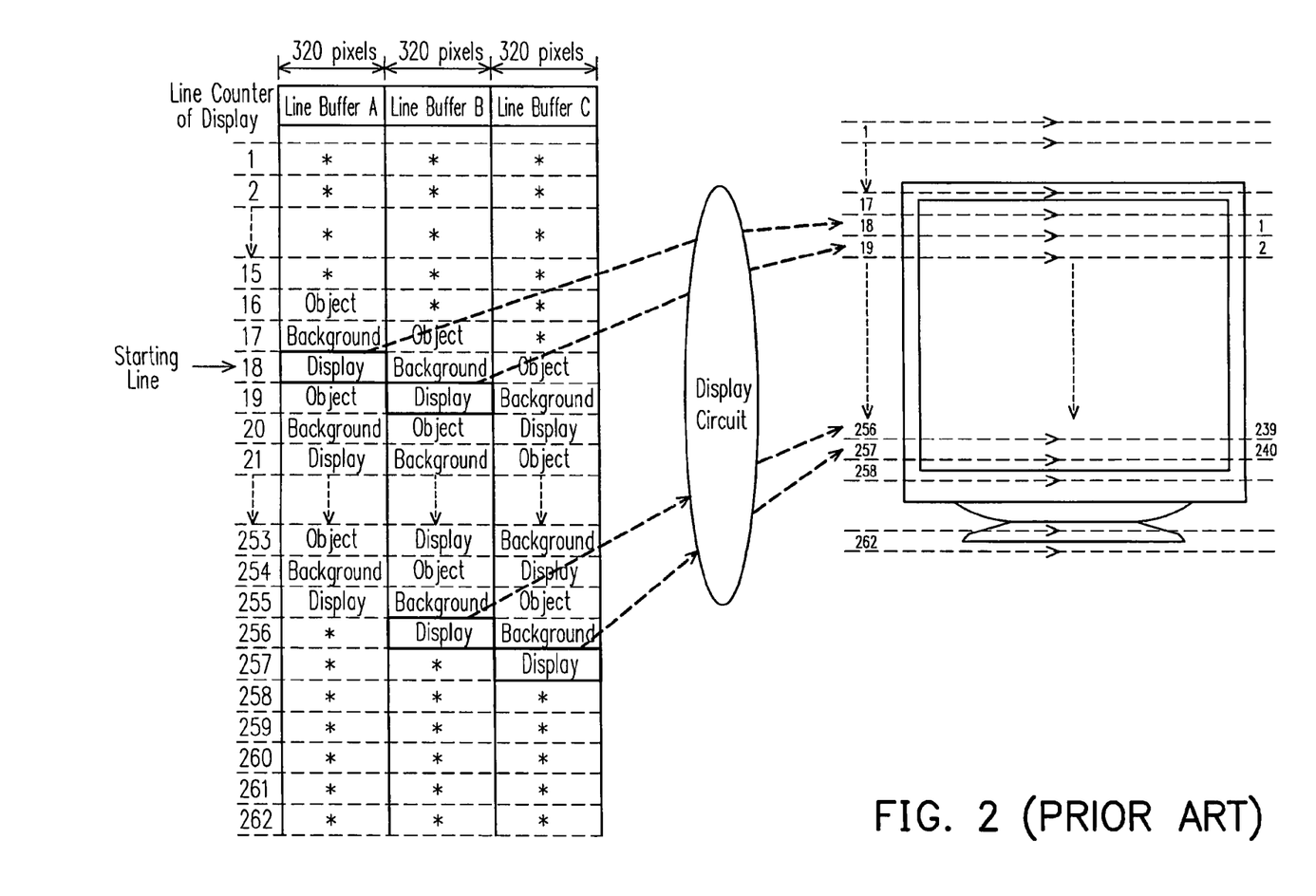
FIG. 2 is a schematic diagram illustrating a conventional GPU processing graphic data.

Unlike those conventional CPUs which adopt a serial computation, a typical GPU is configured with a parallel architecture for graphic processing in instantly dealing with a large amount of data. FIG. 2 is a schematic diagram illustrating a conventional GPU for processing graphic data. Referring to FIG. 2, the conventional technology processes graphic data by progressively drawing lines and processing multiple lines in parallel so as to improve the speed of graphic processing. As shown in FIG. 2, the GPU are equipped with a line buffer A, a line buffer B, and a line buffer C, for alternately storing data of different lines. When practically processing to drawing a frame, the GPU alternately stores data of three lines into the three sets of line buffers.

Referring to FIG. 2, when a line counter counts a counting number of 17, a background portion of the frame is stored in the line buffer A. When the line counter counts a counting number of 18, the line in the line buffer A is provided for the display to display. After displaying the frame of the $18^{th}$ line, frames of other lines are continuously drawn and provided to overlap the frame data previously stored in the line buffer A.

It should be noted that at a time point displaying the $17^{th}$ line, the GPU draws an object portion of the $19^{th}$ line at the same time, and stores the same into the line buffer B; and at a time point displaying the $18^{th}$ line, the GPU draws a background portion of the $19^{th}$ line at the same time and stores the same into the line buffer B, and draws an object portion of the $20^{th}$ line at the same time and stored the same into the line buffer C. In such a way, parallel processing and instant display can be achieved by the continuous line data alternately provided by these three sets of line buffers.

All graphic data obtained from the GPU are temporarily stored in a memory thereof. As such, only after the display displays the graphic data, the memory can be used to store data of a next line. However, considering the production cost, a GPU can be equipped with a memory (often a static memory) having a restricted memory volume. Therefore, only data of a certain amount of lines can be temporarily stored in the memory. Unfortunately, once an unexpected delay occurs in the graphic processing, subsequential display will be affected. According to the aforesaid example, the GPU is capable of temporarily storing data of three lines, and must be maintained for instant refreshing. Whenever the graphic processing of any one of the lines delays, a frame error (displaying an uncompleted line), or a frame delay (waiting for the completeness of the line and displaying thereafter) may occur. Further, most of the graphic drawing processing of the conventional technology such as drawing and frame decoding are controlled by hardware circuits, and the algorithms adopted therein are also defined and realized by certain circuits. As such, ordinary users are incapable of modifying the control process or performing a custom operation as desired. In this concern, the flexibility and performance of the GPU is relatively restricted.

SUMMARY OF THE INVENTION

Accordingly, the present invention is directed to a drawing control method, used for controlling a drawing unit to draw a frame. The frame includes a plurality of lines. The drawing control method includes the steps of: (a) receiving a drawing instruction sent by a processing unit, and activating a counter to accumulate a counting number for controlling the drawing unit to draw the frame according to the counting number, in which the drawing instruction is used for instructing the drawing unit to draw the $m^{th}$ line to the $n^{th}$ line of the frame, and m and n are positive integers; (b) when the counting number accumulated by the counter reaches m−3, controlling the drawing unit to draw an object portion of the $m^{th}$ line, and accumulating the counting number upon the completion of the drawing of the object portion; (c) when the counting number accumulated by the counter reaches m−2, controlling the drawing unit to draw a background portion of the $m^{th}$ line, and accumulating the counting number upon the completion of the drawing of the background portion; and (d) when the counting number accumulated by the counter reaches m−1, controlling the drawing unit to move all drawn portions of the $m^{th}$ line to an external frame buffer outside the drawing unit for storing.

According to an embodiment of the present invention, after the step (d), the drawing unit further controls a display controller to read the drawn $m^{th}$ line of the frame and outputs the same to a display for display.

According to an embodiment of the present invention, the step (b) further includes controlling the drawing unit to store the object portion of the $m^{th}$ line in a first line buffer inside the drawing unit, and the step (d) further includes controlling the drawing unit to move the line stored in the first line buffer to the external frame buffer outside the drawing unit for storing.

According to an embodiment of the present invention, in the meantime of controlling the drawing unit to draw the background portion of the $m^{th}$ line, the drawing control method further includes controlling the drawing unit to draw an object portion of the $m+1^{th}$ line and storing the drawn object portion into a second line buffer inside the drawing unit.

According to another embodiment of the present invention, in the meantime of controlling the drawing unit to store the current drawn line to the external frame buffer outside the drawing unit for storing, the drawing control method further includes controlling the drawing unit to draw a background portion of the $m+1^{th}$ line and storing the drawn background portion into the second line buffer inside the drawing unit, and controlling the drawing unit to draw an object portion of the $m+2^{th}$ line and storing the drawn object portion into a third line buffer inside the drawing unit.

According to an embodiment of the present invention, the foregoing step (a) further includes transmitting a horizontal synchronizing signal and a vertical synchronizing signal to the drawing unit, for resetting lines stored in the first line buffer, the second line buffer, and the third line buffer of the drawing unit.

According to an embodiment of the present invention, the drawing control method further includes repeating the steps (b) through (d), for controlling the drawing unit to sequentially draw and move the rest lines of the frame, until the $n^{th}$ line of the frame is drawn and moved.

According to an embodiment of the present invention, the drawing control method further includes receiving a drawing stop instruction sent by the processing unit, and therefore controlling the drawing unit to stop drawing the lines of the frame; the processing unit controlling a drawing function component of the drawing unit to change a property of the frame which is being drawn; and receiving the drawing start instruction sent by the processing unit, and therefore controlling the drawing unit to draw the next line of the frame.

According to an embodiment of the present invention, the foregoing step of the counter accumulating the counting number includes receiving a drawing completion signal fed back upon a completion of drawing a line and correspondingly accumulating the counting number.

According to an embodiment of the present invention, the $m^{th}$ line through the $n^{th}$ line are all or a part of the scan lines of the frame.

The present invention provides a drawing control apparatus, used for controlling a drawing unit to draw a frame. The frame includes a plurality of lines. The drawing control apparatus includes a counter and a controller. The counter is provided for accumulating a counting number. The controller is used for receiving a drawing instruction sent by a processing unit, and activating the counter to count the counting number for controlling the drawing unit to draw the frame according to the counting number, in which when the counting number accumulated by the counter reaches m−3, the drawing unit is controlled to draw an object portion of the $m^{th}$ line, and the counting number is accumulated upon the completion of the drawing of the object portion, in which m is a positive integer; when the counting number accumulated by the counter reaches m−2, the drawing unit is controlled to draw a background portion of the $m^{th}$ line, and the counting number is accumulated upon the completion of the drawing of the background portion; and when the counting number accumulated by the counter reaches m−1, the drawing unit is controlled to move all drawn portions of the $m^{th}$ line to an external frame buffer outside the drawing unit for storing.

According to an embodiment of the present invention, the drawing control apparatus further includes a synchronizing signal generator, for generating a horizontal synchronizing signal and a vertical synchronizing signal and transmitting the same to the drawing unit, for resetting lines stored in a first line buffer, a second line buffer, and a third line buffer of the drawing unit.

The present invention further provides a drawing control system, which includes a drawing unit, a processing unit, a system memory, a frame buffer, and a drawing control apparatus. The drawing unit is used for drawing a frame, which includes a plurality of lines. The processing unit is used for transmitting a drawing instruction for instructing the drawing unit to draw the $m^{th}$ line through the $n^{th}$ lines, in which m and n are positive integers. The system memory is coupled to the drawing unit and the processing unit, for storing an original frame required by the drawing unit for drawing the frame. The frame buffer is coupled to the drawing unit and the processing unit, for storing lines drawn by the drawing unit. The drawing control apparatus is coupled to the drawing unit and the processing unit, for receiving drawing instructions sent by the drawing unit, and activating the counter to count a counting number for controlling the drawing unit to draw the frame according to the counting number. It should be noted that when the counting number accumulated by the counter reaches m−3, the drawing unit is controlled to draw an object portion of the $m^{th}$ line, and the counting number is accumulated upon the completion of the drawing of the object portion, in which m is a positive integer; when the counting number accumulated by the counter reaches m−2, the drawing unit is controlled to draw a background portion of the $m^{th}$ line, and the counting number is accumulated upon the completion of the drawing of the background portion; and when the counting number accumulated by the counter reaches m−1, the drawing unit is controlled to move all drawn portions of the $m^{th}$ line to an external frame buffer outside the drawing unit for storing.

According to an embodiment of the present invention, the drawing unit is further coupled to a display controller, for controlling the display to read the $m^{th}$ line stored in the frame buffer, and outputting the same to a display for display.

According to an embodiment of the present invention, the drawing unit includes a first line buffer, a second line buffer, and a third line buffer, used for storing the $m^{th}$ line, the $m+1^{th}$ line, and the $m+2^{th}$ line, respectively.

Before displaying a frame of each line, the present invention controls the drawing unit with the controller to draw an object portion and a background portion of the line, according to the counting number accumulated by the counter, and when each line of the frame is drawn, the frame is then outputted to the frame buffer outside the drawing unit. As such, the present invention is used to provide instant frame data for the display to display, so as to prevent undesired delay in frame displaying.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference counting numbers are used in the drawings and the description to refer to the same or like parts.

Unlike conventional drawing process controlled by hardware circuits, the present invention disposes a drawing control apparatus between a processing unit and a drawing unit. The drawing control apparatus is used for drawing lines in a certain range of a frame according to different demands, and is capable of instantly pausing the drawing of the lines and performing a frame property conversion. In such a way, the drawing control apparatus is used to improve a flexibility of the drawing unit in drawing the lines. Further, when completing a drawing of a line, the frame data stored in the drawing unit is then moved to an external frame buffer for storing. In such a way, the frame error or frame delay caused by a delay of the drawing process can be avoided, and therefore the display quality of the lines can be improved. In accordance with the concept discussed above, the present invention provides a drawing control apparatus, a drawing control system, and a drawing control method.

Figure 3:
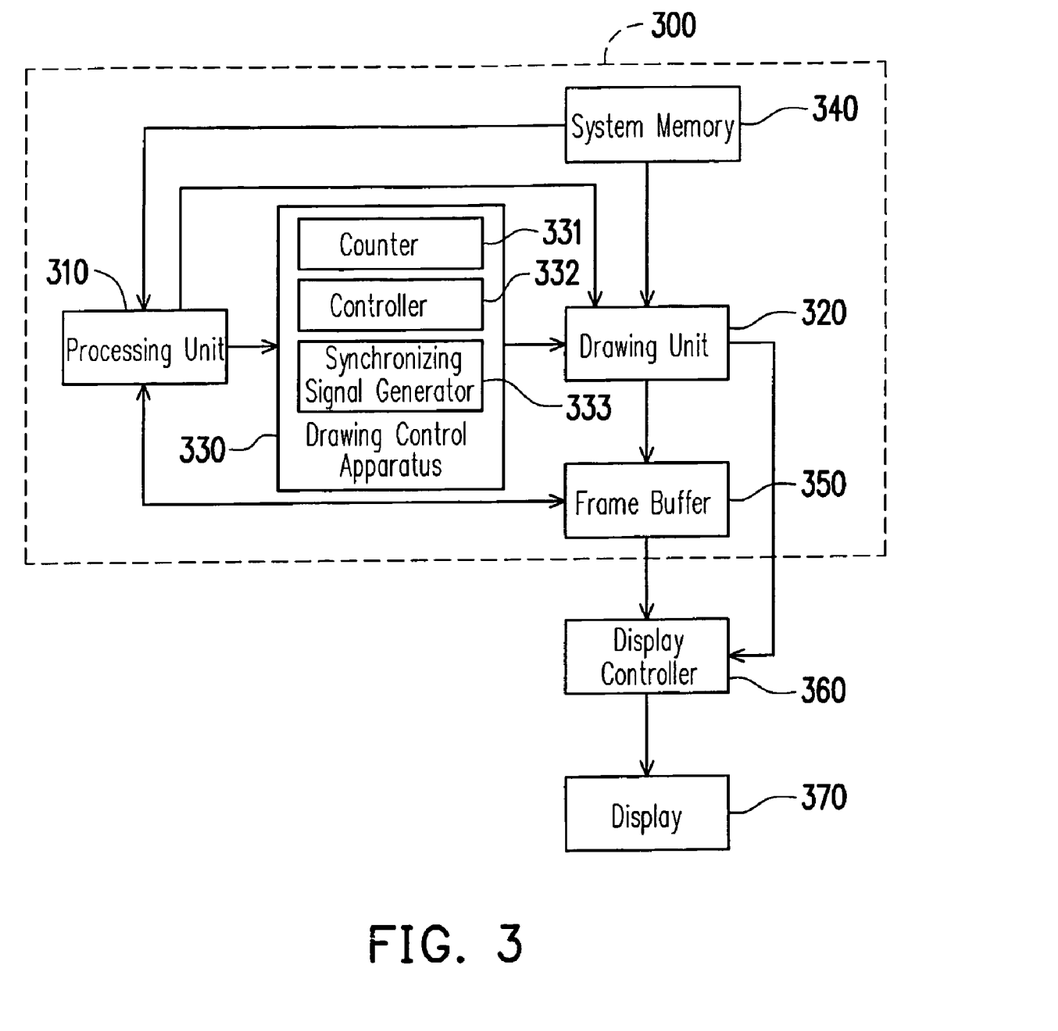
FIG. 3 is a block diagram illustrating a drawing control system according to an embodiment of the present invention.

FIG. 3 is a block diagram illustrating a drawing control system according to an embodiment of the present invention. Referring to FIG. 3, the drawing control system 300 is configured by disposing a drawing control apparatus 330 between a processing unit 310 and a drawing unit 320, for controlling the drawing unit 320 to read an original frame from a system memory 340 according to a drawing instruction transmitted from the processing unit 310, for drawing. Whenever a drawing of frame data of a line is completed, the frame data is moved to a frame buffer 350 for storing, so as to provide instantly refreshed frame data to the display 370 for display. Components of the drawing control system 300 are discussed in details below.

The processing unit 310 is, for example, a central processing unit (CPU) of a computer, for transmitting a corresponding drawing instruction in accordance with a drawing requirement proposed by a user. The drawing instruction is used for instructing the drawing unit 320 to draw the $m^{th}$ line through $n^{th}$ line of the frame, in which m and n are positive integers. For example, a television typically displays a frame including the $18^{th}$ to the $257^{th}$ lines, and therefore the drawing instruction is also provided for instructing the drawing unit 320 to draw the $18^{th}$ line to the $257^{th}$ lines.

The drawing unit 320 is, for example, a graphic processing unit (GPU) disposed on a computer mainboard or a graphics card, for assessing original frame data from the system memory 340 so as to draw the frame. The frame is composed of a plurality of lines. The drawing unit 320 further includes drawing functional elements such as a graphic rendering unit, a geometric transformation unit, a pixel format transformation unit, or the like (not shown), which can provide multiple drawing functions for the processing unit 310 to select.

The drawing control apparatus 330 is disposed between the processing unit 310 and the drawing unit 320, for receiving the drawing instruction sent from the processing unit 310, and controlling the drawing unit 320 to draw the frame according to the received drawing instruction. The drawing control apparatus 330 includes a counter 331, a controller 332, and a synchronizing signal generator 333. After receiving the drawing instruction sent from the processing unit 310, the controller 332 activates the counter 331 to accumulate a counting number, which is, for example, a serial number of a line presently to be drawn. The counting number is then provided for the drawing unit 320 and used as a reference to draw the lines of the frame.

The system memory 340 is respectively coupled to the processing unit 310 and the drawing unit 320, for providing the original frame demanded by the drawing unit 320 for drawing according to the drawing instruction sent from the processing unit 310. The frame buffer 350 is respectively coupled to the processing unit 310 and the drawing unit 320, for storing the frame drawn by the drawing unit 320 and outputting the same to the display 370 for display.

It should be noted that, unlike the conventional technology, in which the time of drawing a line is determined according to a scan frequency of the display (for example a scan frequency of a television is 15.734 kHz), the present invention determines the time points for drawing and removing the lines according to the counter 331 of the drawing control apparatus 330. Specifically, whenever the drawing control apparatus 330 receives a drawing completion signal fed back by the drawing unit 320, the counting number of the counter is then accumulated, and a next stage of frame drawing and moving is started. Such operations are not restricted by a predetermined timetable, and in such a way, such that an efficiency of drawing frames can be improved.

According to an embodiment of the present invention, each frame is divided into an object portion and a background portion, which are drawn in different time point corresponding to different counting numbers. When completing drawing of a line, the data of the line is moved to the frame buffer 350 for storing, rather than being accessed by the drawing unit 320 in a time about to be displayed. As such, the present invention is used to avoid the problems caused by a delay in the drawing process. Details are given below for illustrating how the drawing control apparatus 330 controls the drawing unit 3320 to draw the frame.

Figure 4:
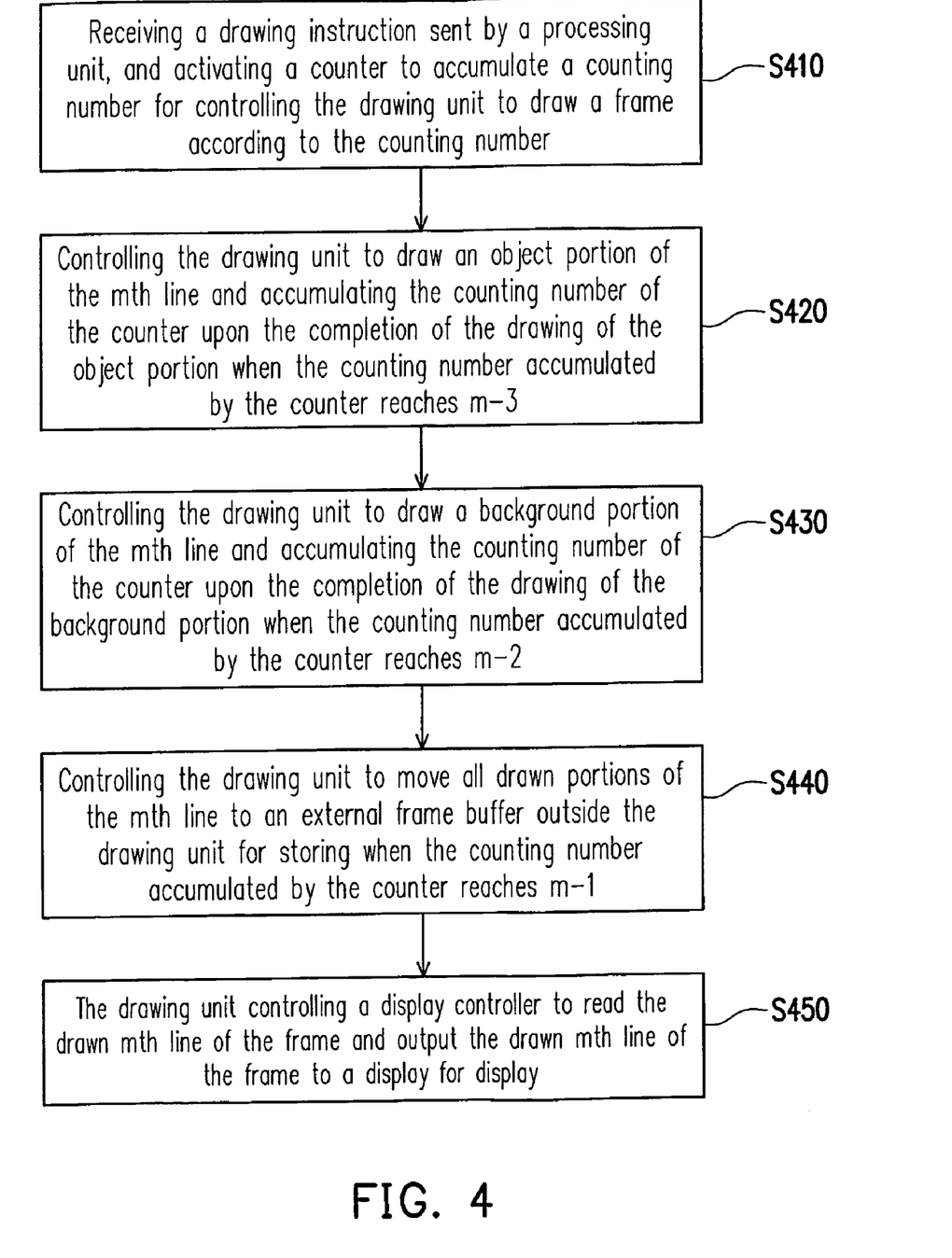
FIG. 4 is a flow chart illustrating a drawing control method according to an embodiment of the present invention.

FIG. 4 is a flow chart illustrating a drawing control method according to an embodiment of the present invention. Referring to FIG. 4, according to the embodiment of the present invention, the drawing control method controls the drawing unit having the foregoing drawing control apparatus to draw a frame. The frame includes a plurality of lines. The method includes the following steps.

First, at step S410, the controller of the drawing control apparatus receives a drawing instruction sent by the processing unit, and then activates the counter to accumulate a counting number, so as to control the drawing unit to draw the frame according to the counting number. The drawing instruction is used for instructing the drawing unit to draw the $m^{th}$ line through $n^{th}$ line of the frame, in which m and n are positive integers. Further, before activating the counter, the controller of the drawing control apparatus controls the synchronizing signal generator to generate and transmit a horizontal synchronizing signal and a vertical synchronizing signal to the drawing unit, for resetting the lines stored in the drawing unit.

At step S420, when the counting number accumulated by the counter reaches m−3, the controller of the drawing control apparatus controls the drawing unit to draw an object portion of the $m^{th}$ line, and accumulates the counting number upon the completion of the drawing of the object portion.

At step S430, when the counting number accumulated by the counter reaches m−2, the controller of the drawing control apparatus controls the drawing unit to draw a background portion of the $m^{th}$ line, and accumulates the counting number upon the completion of the drawing of the background portion.

At step S440, when the counting number accumulated by the counter reaches m−1, the controller of the drawing control apparatus controls the drawing unit to move all drawn portions of the $m^{th}$ line to an external frame buffer outside the drawing unit for storing. After all drawn portions of the $m^{th}$ line are moved to the external frame buffer, it indicates that the drawing of the $m^{th}$ line has been completed and moved to the external frame buffer, and the $m^{th}$ line is ready for display.

Finally, at step S450, the drawing unit controls a display controller to read the drawn $m^{th}$ line of the frame and output the same to a display for display. In this case, because the drawing of the $m^{th}$ line has been previously completed, there won't be any problem of frame error or frame delay occurred thereby.

It should be noted that the drawing unit is further equipped with a first line buffer, a second line buffer, and a third line buffer, for storing the $m^{th}$ line, the $m+1^{th}$ line, and the $m+2^{th}$ line. The drawing control apparatus is configured with a parallel configuration, in which when an object portion of a line is being drawn, at the same time a background portion of another line is also being drawn, and at the same time a drawn line including an object portion and a background portion thereof is being moved to a frame buffer for storing. Details thereof are to be given below in accordance with a further embodiment.

Figure 5:
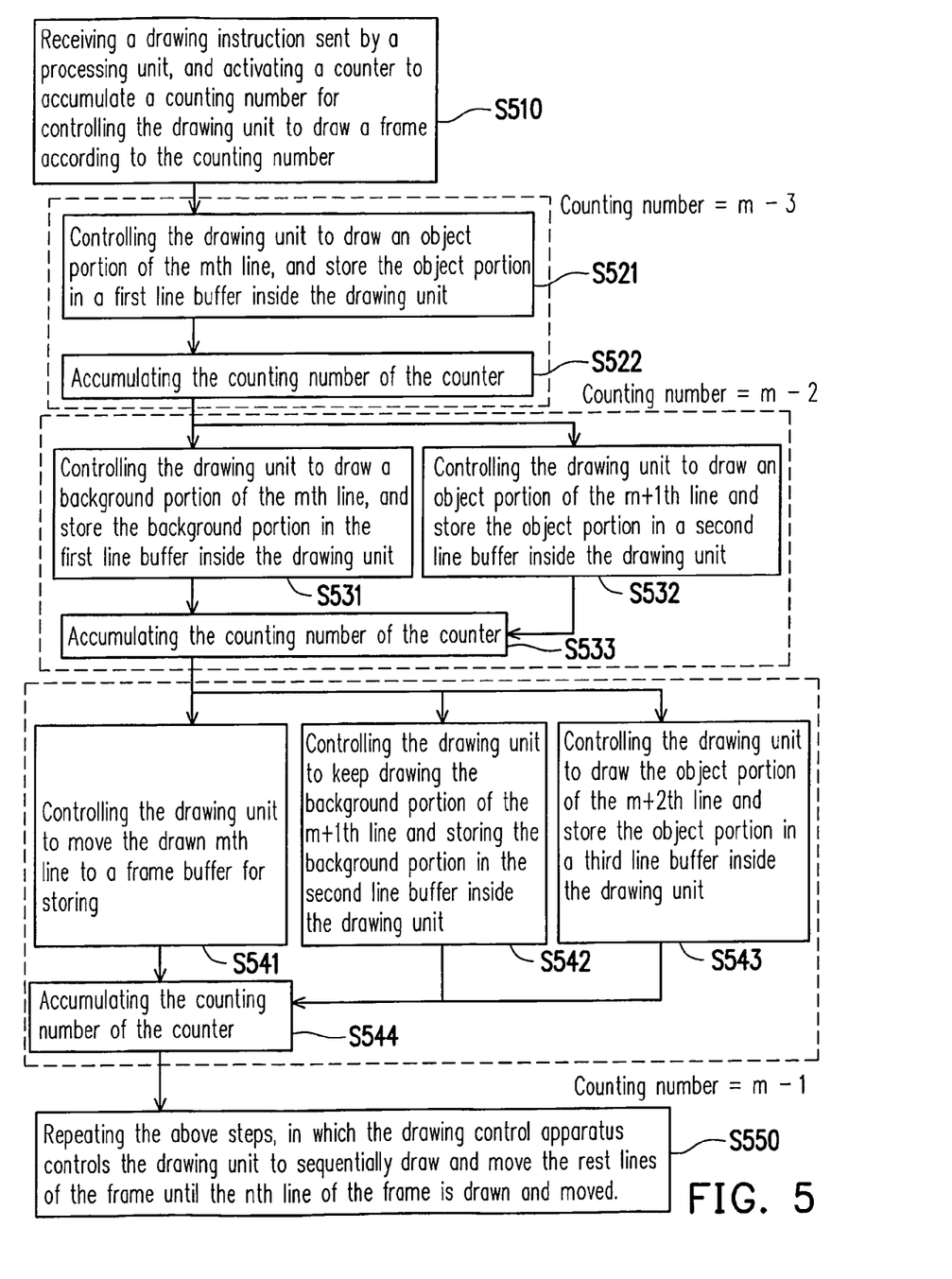
FIG. 5 is a flow chart illustrating a drawing control method according to an embodiment of the present invention.

FIG. 5 is a flow chart illustrating a drawing control method according to an embodiment of the present invention. Referring to FIG. 5, the drawing control method of the present embodiment controls the drawing unit having the foregoing drawing control apparatus to draw a frame. The frame includes a plurality of lines. The method includes the following steps.

First, at step S510, the drawing control apparatus receives the drawing instruction sent by the processing unit, and then activates the counter to accumulate the counting number, so as to control the drawing unit to draw the frame according to the counting number. The drawing instruction is used for instructing the drawing unit to draw the $m^{th}$ line through $n^{th}$ line of the frame, in which m and n are positive integers. Further, before activating the counter, the controller of the drawing control apparatus controls the synchronizing signal generator to generate and transmit a horizontal synchronizing signal and a vertical synchronizing signal to the drawing unit, for resetting the lines stored in the first line buffer, the second line buffer and the third line buffer of the drawing unit.

At step S521, when the counting number accumulated by the counter reaches m−3, the controller of the drawing control apparatus controls the drawing unit to draw an object portion of the $m^{th}$ line, and stores the object portion of the $m^{th}$ line in the first line buffer. And at step S522, the counting number is accumulated upon the completion of the drawing of the object portion.

At step S531, when the counting number accumulated by the counter reaches m−2, the controller of the drawing control apparatus controls the drawing unit to draw a background portion of the $m^{th}$ line, and stores the background portion of the $m^{th}$ line in the first line buffer. And at the same time, at step S532, the controller of the drawing control apparatus also controls the drawing unit to draw an object portion of the $m+1^{th}$ line, and stores the object portion of the $m+1^{th}$ line in the second line buffer. And at step S533, the counting number is accumulated upon the completion of the drawing of the foregoing portions.

At step S541, when the counting number accumulated by the counter reaches m−1, the drawing unit is controlled to move the drawn $m^{th}$ line to the frame buffer for storing. At the same time, at step S542, the drawing unit is controlled to keep drawing the background portion of the $m+1^{th}$ line, and store the background portion of the $m+1^{th}$ line in the second line buffer inside the drawing unit. Further, at step S543, the drawing unit is controlled to draw the object portion of the $m+2^{th}$ line, and store the object portion of the $m+2^{th}$ line in the third line buffer inside the drawing unit. And at step S544, the counting number is accumulated upon the completion of the drawing and moving of the foregoing portions.

Finally, at step S550, the above steps are repeated, in which the drawing unit is controlled to sequentially draw and move the rest lines of the frame, until the $n^{th}$ line of the frame is drawn and moved. Specifically, after the $m^{th}$ line is moved from the first line buffer to the frame buffer, the drawing control apparatus keeps controlling the drawing unit to draw the object portion of the $m+3^{th}$ line and storing the same into the first frame buffer, and moves the drawn $m+1^{th}$ line to the frame buffer, and at the same time the drawing unit is controlled to draw the background portion of the $m+2^{th}$ line and store the same in the second line buffer. In such a way, parallel processing and instant display can be achieved by alternately performing the foregoing steps of drawing the objection portion and background portion of the lines and moving the portions of the lines.

Figure 6:
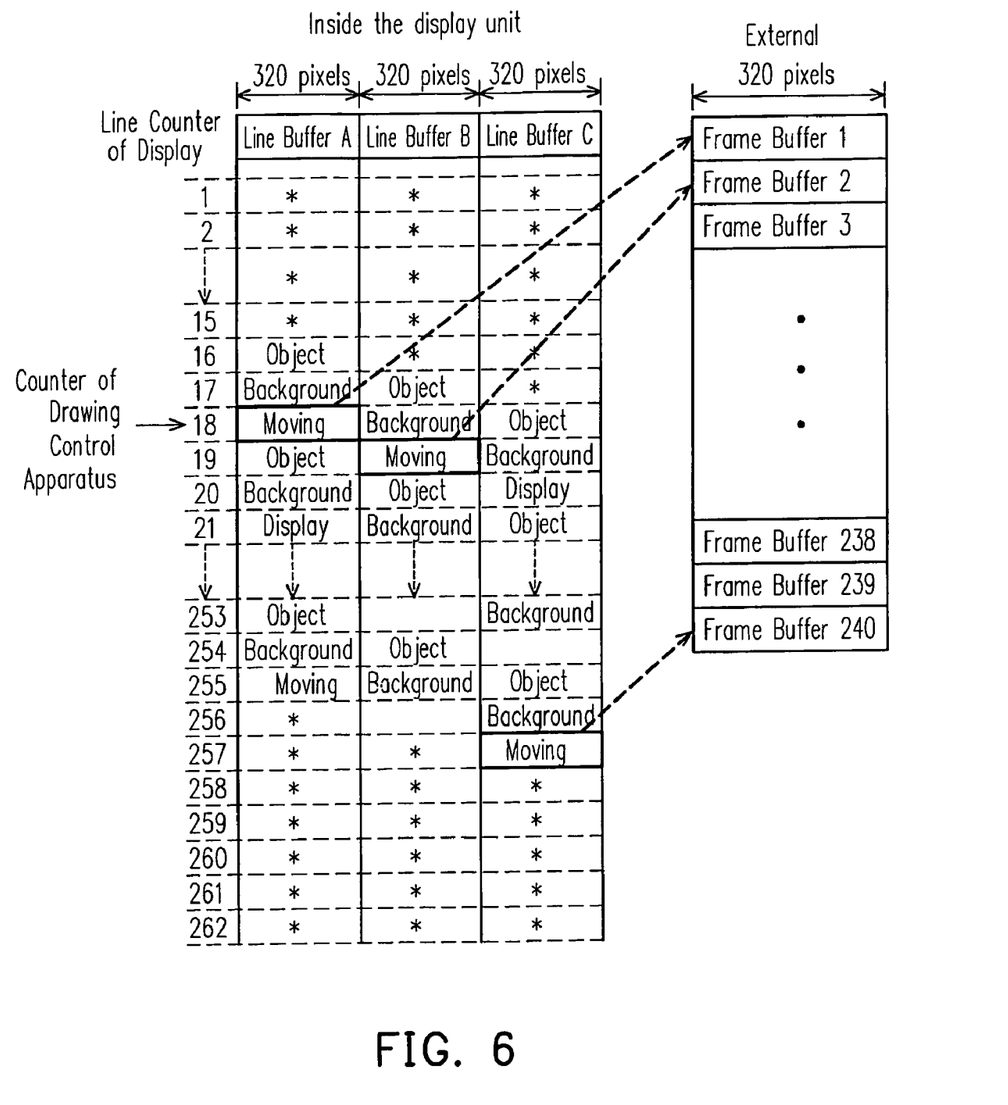
FIG. 6 illustrates a drawing control method according to an embodiment of the present invention.

FIG. 6 illustrates a drawing control method according to an embodiment of the present invention. Referring to FIG. 6, drawing a frame of a television is taken as an example for illustrating the detailed steps of drawing the object portion, the background portion, and moving the portions by using the parallel configuration.

As shown in FIG. 6, a frame of a television typically displays from the $18^{th}$ line of the frame, and therefore the drawing control apparatus of the present invention controls the drawing unit to draw an object portion of the $18^{th}$ line and store the drawn objection portion into a line buffer A when the counting number of the counter reaches 15, and accumulates the counting number of the counter when the objection portion of the $18^{th}$ line is drawn. When the counting number of the counter reaches 16, the objection portion of the $18^{th}$ line has already been stored in the line buffer A, and meanwhile the drawing control apparatus keeps controlling the drawing unit to draw a background portion of the $18^{th}$ line and storing the same into the line buffer A. At the same time, the drawing unit is also controlled to draw an object portion of the $19^{th}$ line and store the same into a line buffer B, and the counting number of the counting number is accumulated when all portions are drawn.

When the counting number reaches 17, the line buffer A has already had frame data of the entire $18^{th}$ line, while the line buffer B has also had the object portion of the $19^{th}$ line. In this time, the drawing control apparatus controls the drawing unit to move the frame data of the drawn $18^{th}$ line to an external frame buffer 1 outside the drawing unit for storing. Meanwhile, the drawing control apparatus still keeps controlling the drawing unit to draw a background portion of the $19^{th}$ line and store the same into the line buffer B, and also control the drawing unit to draw an object portion of the $20^{th}$ line and store the same into a line buffer C.

Likewise, when the counting number of the counter reaches 257, the drawing control apparatus controls the drawing unit to move the frame data of the $257^{th}$ line to the frame buffer 240 for storing. Till now, the drawing of an entire frame is completed. As the capacity of the external frame buffers 1 through 240 are capable of accommodating data of the entire frame, the external frame buffers can be accessed by the display controller so to display the frame. Comparing with the conventional technology, in which data of the lines is accessed from the memory of the drawing unit when displaying and only one line can be provided at a time, the present invention moves drawn lines to the frame buffers in advance, thus achieving the effectiveness of parallel processing and instant display.

It should be noted that drawing control method of the present invention may further include the step of temporarily pausing the drawing of the frame and alternatively controlling the drawing unit to change the property of the lines being drawn in accordance with different requirements, which can simplify the process of the drawing unit drawing the frame, and improves the flexibility and efficiency thereof. A further embodiment is given below for further illustration.

Figure 7:
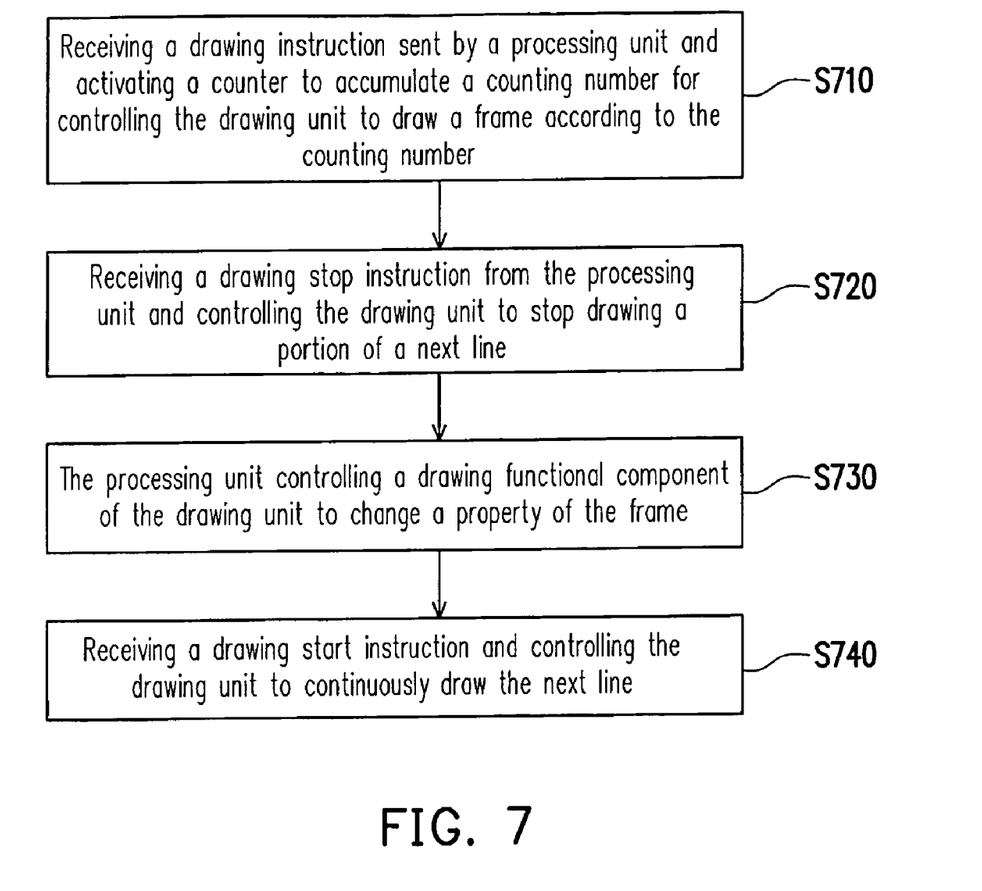
FIG. 7 is a flow chart illustrating a drawing control method according to an embodiment of the present invention.

FIG. 7 is a flow chart illustrating a drawing control method according to an embodiment of the present invention. Referring to FIG. 7, the drawing control method of the present embodiment controls the drawing unit having the foregoing drawing control apparatus to draw a frame. The frame includes a plurality of lines. The method includes the following steps.

First, at step S710, a controller of the drawing control apparatus receives the drawing instruction sent by the processing unit, and then activates a counter to accumulate a counting number, and control the drawing unit to draw the frame according to the counting number. The drawing instruction is used for instructing the drawing unit to draw the $m^{th}$ line through $n^{th}$ line of the frame, in which m and n are positive integers.

Then at step S720, the drawing control apparatus receives a drawing stop instruction from the processing unit, and controls the drawing unit to stop drawing a portion of a next line.

Then at step S730, the processing unit controls a drawing functional component of the drawing unit to change a property of the frame. The drawing functional component can be, but not limited to, a graphic rendering unit, a geometric transformation unit, or a pixel format transformation unit, and the property changed hereby can be the format or the content of the frame.

Finally, at step S740, the drawing control apparatus receives the drawing start instruction, and thus controls the drawing unit to continuously draw the next line. Specifically, a certain property of the frame has been changed, such that the burden of the drawing unit for drawing the frame can be reduced and the drawing efficiency can be improved correspondingly. For example, when it is desired to draw water ripples, it is needed to change a property of each line, rather than drawing all lines again. Therefore, the method of the present embodiment can be used to change the property of the drawn frame in advance, so as to increase the efficiency of drawing the frame.

In summary, the drawing control method, the drawing control apparatus, and the drawing control system of the present invention takes use of an independent drawing control apparatus to control a drawing unit to draw a frame, and move the drawn frame to an external frame buffer in advance, and therefore are not restricted by the capacity of the memory of the drawing unit. Further, the present invention employs a counter to accumulate a counting number upon each time a drawing or a moving of the frame is completed, and then continues to control the drawing unit to perform a next stage of frame drawing or frame moving. In this concern, the present invention eliminates the time for external access, thus achieving the effectiveness of parallel processing, and instant display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A drawing control method, used for controlling a drawing unit to draw a frame, the frame comprising a plurality of lines, the drawing control method comprising:
  (a) receiving a drawing instruction sent by a processing unit, and activating a counter to accumulate a counting number for controlling the drawing unit to draw the frame according to the counting number, wherein the drawing instruction is used for instructing the drawing unit to draw the $m^{th}$ line to the $n^{th}$ line of the frame, wherein m and n are positive integers;
  (b) when the counting number accumulated by the counter reaches m−3, controlling the drawing unit to draw an object portion of the $m^{th}$ line, and accumulating the counting number upon the completion of the drawing of the object portion;
  (c) when the counting number accumulated by the counter reaches m−2, controlling the drawing unit to draw a background portion of the $m^{th}$ line, and accumulating the counting number upon the completion of the drawing of the background portion; and
  (d) when the counting number accumulated by the counter reaches m−1, controlling the drawing unit to move all drawn portions of the $m^{th}$ line to an external frame buffer outside the drawing unit for storing.

2. The drawing control method according to claim 1, wherein after step (d), the method further comprises:
  (e) the drawing unit controlling a display controller to read the $m^{th}$ line of the frame stored in the frame buffer and outputting the $m^{th}$ line of the frame to a display for displaying.

3. The drawing control method according to claim 1, wherein the step (b) further comprises:
  controlling the drawing unit to store the object portion of the $m^{th}$ line in a first line buffer inside the drawing unit.

4. The drawing control method according to claim 3, wherein the step (d) further comprises:
  controlling the drawing unit to move the line stored in the first line buffer to the external frame buffer outside the drawing unit for storing.

5. The drawing control method according to claim 3, wherein in the meantime of controlling the drawing unit to draw the background portion of the $m^{th}$ line, the method further comprises:
  controlling the drawing unit to draw an object portion of the $(m+1)^{th}$ line, and storing the drawn object portion into a second line buffer inside the drawing unit.

6. The drawing control method according to claim 5, wherein in the meantime of controlling the drawing unit to store the current drawn line to the external frame buffer outside the drawing unit for storing, the method further comprises:
  controlling the drawing unit to draw a background portion of the $(m+1)^{th}$ line, and storing the drawn background portion into the second line buffer inside the drawing unit; and controlling the drawing unit to draw an object portion of the $(m+2)^{th}$ line, and storing the drawn object portion into a third line buffer inside the drawing unit.

7. The drawing control method according to claim 6, wherein the step (a) further comprises:
transmitting a horizontal synchronizing signal and a vertical synchronizing signal to the drawing unit for resetting lines stored in the first line buffer, the second line buffer, and the third line buffer of the drawing unit.

8. The drawing control method according to claim 6, wherein the step (a) further comprises:
repeating the steps (b) through (d), for controlling the drawing unit to sequentially draw and move the rest lines of the frame until the $n^{th}$ line of the frame is drawn and moved.

9. The drawing control method according to claim 1, further comprising:
receiving a drawing stop instruction sent by the processing unit, and controlling the drawing unit to stop drawing the lines of the frame;
the processing unit controlling a drawing function component of the drawing unit to change a property of the frame which is being drawn; and
receiving the drawing start instruction sent by the processing unit, and controlling the drawing unit to draw the next line of the frame.

10. The drawing control method according to claim 1, wherein the step of accumulating the counting number comprises:
receiving a drawing completion signal fed back upon a completion of drawing a line, and correspondingly accumulating the counting number.

11. The drawing control method according to claim 1, wherein the $m^{th}$ line through the $n^{th}$ line are all or a part of the scan lines of the frame.

12. A drawing control apparatus, used for controlling a drawing unit to draw a frame, the frame comprising a plurality of lines, the drawing control apparatus comprises:
a counter, used for accumulating a counting number; and
a controller, used for receiving a drawing instruction sent by a processing unit, and activating the counter to accumulate a counting number for controlling the drawing unit to draw the frame, wherein
when the counting number accumulated by the counter reaches m−3, the drawing unit is controlled to draw an object portion of the $m^{th}$ line, and the counting number is accumulated upon the completion of the drawing of the object portion, wherein m is a positive integer;
when the counting number accumulated by the counter reaches m−2, the drawing unit is controlled to draw a background portion of the $m^{th}$ line, and the counting number is accumulated upon the completion of the drawing of the background portion; and
when the counting number accumulated by the counter reaches m−1, the drawing unit is controlled to move all drawn portions of the $m^{th}$ line to an external frame buffer outside the drawing unit for storing.

13. The drawing control apparatus according to claim 12, wherein after an object portion of the $m^{th}$ line is drawn, the drawing control apparatus controls the drawing unit to store the object portion of the $m^{th}$ line in a first line buffer inside the drawing unit.

14. The drawing control apparatus according to claim 12, wherein after the $m^{th}$ line is drawn, the controller also controls the drawing unit to store the $m^{th}$ line in a frame buffer outside the drawing unit.

15. The drawing control apparatus according to claim 12, wherein when controlling the drawing unit to draw the background portion of the $m^{th}$ line, the controller also controls the drawing unit to draw an object portion of the $m+1^{th}$ line, and stores the drawn object portion into a second line buffer inside the drawing unit.

16. The drawing control apparatus according to claim 12, wherein when controlling the drawing unit to store the current drawn line to the external frame buffer outside the drawing unit for storing, the controller further comprises:
controlling the drawing unit to draw a background portion of the $m+1^{th}$ line, and storing the drawn background portion into the second line buffer inside the drawing unit; and
controlling the drawing unit to draw an object portion of the $m+2^{th}$ line, and storing the drawn object portion into a third line buffer inside the drawing unit.

17. The drawing control apparatus according to claim 12, further comprising:
a synchronizing signal generator, for generating a horizontal synchronizing signal and a vertical synchronizing signal and transmitting the same to the drawing unit, for resetting lines stored in a first line buffer, a second line buffer, and a third line buffer of the drawing unit.

18. The drawing control apparatus according to claim 12, wherein the controller is used for receiving a drawing stop instruction sent by the processing unit, and controlling the drawing unit to stop drawing a next line of the frame.

19. The drawing control apparatus according to claim 18, wherein the controller is used for receiving a drawing start instruction sent by the processing unit, and controlling the drawing unit to draw the next line of the frame with a changed property.

20. A drawing control system, comprising:
a drawing unit, used for drawing a frame, the frame comprising a plurality of lines;
a processing unit, used for transmitting a drawing instruction, the drawing instruction being used for instructing the drawing unit to draw the $m^{th}$ line through the $n^{th}$ lines, wherein m and n are positive integers;
a system memory, coupled to the drawing unit and the processing unit, for storing an original frame required by the drawing unit for drawing the frame;
a frame buffer, coupled to the drawing unit and the processing unit, for storing lines drawn by the drawing unit; and
a drawing control apparatus, coupled to the drawing unit and the processing unit, for receiving drawing instructions sent by the drawing unit, and activating the counter to accumulate a counting number for controlling the drawing unit to draw the frame, wherein
when the counting number accumulated by the counter reaches m−3, the drawing unit is controlled to draw an object portion of the $m^{th}$ line, and the counting number is accumulated upon the completion of the drawing of the object portion;
when the counting number accumulated by the counter reaches m−2, the drawing unit is controlled to draw a background portion of the $m^{th}$ line, and the counting number is accumulated upon the completion of the drawing of the background portion; and
when the counting number accumulated by the counter reaches m−1, the drawing unit is controlled to move all drawn portions of the $m^{th}$ line to an external frame buffer outside the drawing unit for storing.

21. The drawing control system according to claim 20, wherein the drawing unit is coupled to a display controller for controlling the display to read the $m^{th}$ line stored in the frame buffer, and outputting the same for displaying on the display.

22. The drawing control system according to claim 20, wherein the drawing unit further comprises:
   a first line buffer, used for storing the $m^{th}$ line drawn by drawing unit;
   a second line buffer, used for storing the $m+1^{th}$ line drawn by drawing unit; and
   a third line buffer, used for storing the $m+2^{th}$ line drawn by drawing unit.

23. The drawing control system according to claim 22, wherein when controlling the drawing unit to draw the background portion of the $m^{th}$ line, the drawing control apparatus also controls the drawing unit to draw an object portion of the $m+1^{th}$ line, and stores the drawn object portion into the second line buffer inside the drawing unit.

24. The drawing control system according to claim 22, wherein when controlling the drawing unit to store the current drawn line to the external frame buffer outside the drawing unit for storing, the drawing control apparatus further comprises:
   controlling the drawing unit to draw a background portion of the $m+1^{th}$ line, and storing the drawn background portion into the second line buffer inside the drawing unit; and
   controlling the drawing unit to draw an object portion of the $m+2^{th}$ line, and storing the drawn object portion into a third line buffer inside the drawing unit.

25. The drawing control system according to claim 22, wherein the drawing control apparatus further comprises transmitting a horizontal synchronizing signal and a vertical synchronizing signal to the drawing unit, for resetting lines stored in a first line buffer, a second line buffer, and a third line buffer of the drawing unit.

26. The drawing control system according to claim 22, wherein the drawing control apparatus is used for receiving a drawing stop instruction sent by the processing unit, and controlling the drawing unit to stop drawing a next line of the frame.

27. The drawing control system according to claim 22, wherein the drawing control apparatus is used for receiving a drawing start instruction sent by the processing unit, and controlling the drawing unit to draw the next line of the frame with a changed property.

* * * * *